Dec. 21, 1948.  R. K. BLACKBURN  2,456,811
PIEZOELECTRIC TEMPERATURE MEASURING AND CONTROL SYSTEM
Filed Oct. 23, 1945
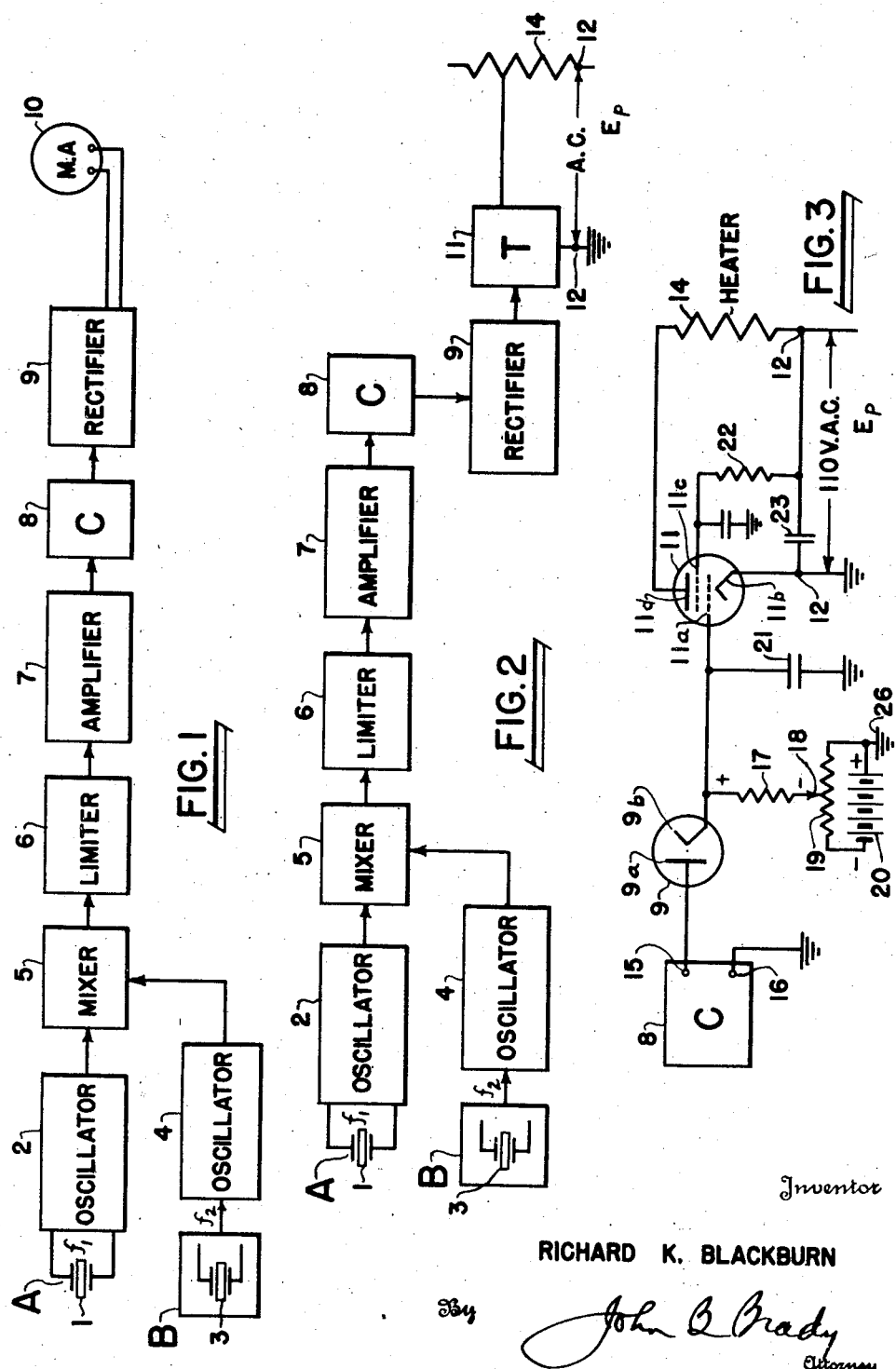
Inventor
RICHARD K. BLACKBURN
By John B. Brady
Attorney Patented Dec. 21, 1948

2,456,811

UNITED STATES PATENT OFFICE 2,456,811

PIEZOELECTRIC TEMPERATURE MEASURING AND CONTROL SYSTEM

Richard K. Blackburn, East Hartford, Conn., assignor to Crystal Research Laboratories, Incorporated, Hartford, Conn., a corporation of Connecticut Application October 23, 1945, Serial No. 623,933

2 Claims. (Cl. 250—27)

My invention relates broadly to piezoelectric crystal systems and more particularly to a system for indicating and controlling temperature by means of piezoelectric crystals.

One of the objects of my invention is to provide a system of piezoelectric crystals in which the differences in the frequency of oscillation may be detected to determine temperature or temperature changes.

Another object of my invention is to provide a piezoelectric crystal system in which crystals of special cuts are selected and arranged in circuits for coaction with each other for producing difference frequencies which are proportional to changes in temperature for enabling direct readings of temperature to be obtained.

Still another object of my invention is to provide a circuit arrangement for a crystal thermometer system in which crystals of special cuts have their outputs combined for operating a direct reading meter calibrated in degrees of temperature for providing temperature readings proportional to frequency or changes in frequency.

Still another object of my invention is to provide a piezoelectric crystal system employing special AT or BT cut crystals having their outputs combined for impressing a difference frequency upon a control circuit for continuously controlling power input to heating or cooling means for accurately controlling temperature.

Other and further objects of my invention reside in a piezoelectric system for reading, controlling or regulating temperatures with high precision, as set forth more fully in the specification hereinafter following by reference to the accompanying drawings in which:

Figure 1 is a block diagram of a crystal thermometer circuit showing a composite piezoelectric crystal system arranged for the direct control of a meter calibrated according to temperature;

Fig. 2 shows a block diagram of a composite system of piezoelectric crystals arranged to control power input to heating or cooling means for continuously controlling such power input; and Fig. 3 schematically shows an electrical control circuit operated or controlled by the piezoelectric crystal temperature control system of my invention.

My invention is directed to a method and apparatus employing piezoelectric quartz crystals as a means of accurately indicating and controlling temperature in the general range of $-70°$ C. to $+500°$ C. My invention embraces two classifications: (1) circuits for indicating temperature, and (2) circuits for applying this indication as an electronic means for continuously controlling power input to heating or cooling means.

I provide circuit arrangements for measuring the difference in frequency of oscillation of two piezoelectric crystals; one of which is a special BT cut temperature sensitive unit, and the other of which is a special AT or BT cut crystal unit in a temperature controlled chamber which is maintained accurate to $\mp 0.1°$ C. The difference in frequency is detected and a resulting proportional audio frequency current amplified and maintained at a constant amplitude with square wave characteristics and then impressed on a rectifier circuit fed by a capacitive network so that the output current will be proportional to frequency. This current operates a milliammeter calibrated to read temperature or is allowed to flow through a resistor and the resultant voltage drop is used as bias potential for a thyratron to control the magnitude of plate current pulses resulting from alternating current plate voltage. This current is supplied to a heater to secure the necessary controlled heating. Temperatures of $0.01°$ C. may be maintained or indicated. By suitable choice of fixed oscillator frequency, the apparatus can be made to indicate either $\Delta T$ or $\pm \Delta T$, that is, change in temperature or change in temperature and sense of direction.

Referring to the drawings in detail, reference character 1 designates a piezoelectric crystal which is a special temperature sensitive crystal represented by letter A, generating a frequency represented as $f_1$ applied to an oscillator system represented generally at 2. A separate piezoelectric crystal 3, represented within the block B, is of AT or BT cut arranged within a temperature control oven. The frequency of piezoelectric crystal 3 is designated as $f_2$ applied to oscillator 4. The outputs of oscillators 2 and 4 are impressed upon the mixer circuit 5 in which the frequencies are combined to produce a beat or difference frequency. The output of the mixer 5 is passed to a limiter circuit designated at 6 and then impressed upon the amplifier system designated at 7. The output of amplifier 7 is connected to the resistive capacitive network represented in block C, designated by reference character 8. The output of the resistive capacitive network 8 is impressed upon the rectifier circuit 9 in such manner that the rectifier output is proportional to frequency. The output of the rectifier 9 is directly connected to the milliammeter 10. The milliammeter 10 is calibrated according to degrees temperature and the choice of the zero position on the calibrated scale is determined by the choice of the value of $f_1-f_2$.

Changes in temperature conditions cause the generation of oscillations at piezoelectric crystal 1 at frequencies dependent upon temperature, as piezoelectric crystal 1 is a temperature sensitive crystal exposed to the area in which the temperature changes are to be measured. On the other hand, the piezoelectric crystal 3 is accurately regulated as to temperature for producing a constant frequency. The variable frequency from source 1 and the constant frequency from source 3 are thus related to the measuring circuit for directly operating meter 10 for reading degrees of temperature in the area in which piezoelectric crystal 1 is exposed.

In order to control power according to temperature conditions, I provide an arrangement as shown in Fig. 2. The basic elements of the system are similar to the parts of the system illustrated and described in connection with Fig. 1, through the rectifier 9 the output of which connects to the thyratron control circuit represented at 11. The thyratron control circuit has the output system thereof arranged to control the source of power designated as supply across the terminals represented at 12 for furnishing the power $E_p$ to the heater circuit, represented by heater element 14.

The thyratron control circuit is illustrated more clearly in Fig. 3 as comprising tube 11 connected to the output of the rectifier system designated at 9. The rectifier 9 is illustrated as having its plate electrode 9a connected to one output terminal 15 of the resistive capacitive network 8, the other terminal 16 of which, is connected to ground. The cathode 9b of rectifier 9 connects through resistance 17 to an adjustable tap 18 on potentiometer 19 shunted by battery 20, one side of which connects to ground 26. The output of rectifier 9 may thus be controlled.

The adjustable tap 18 on the potentiometer 19 is adjusted by a mechanical system in order to provide for a temperature versus time characteristic as described. In one form of my invention I provide an arrangement of cam which is shaped in such manner that the cam, as it progressively moves through angular increments of distance operation to control the movement of a shaft which shifts the tap 18 in pre-arranged manner of potentiometer 19. This variation in the effective resistance according to a pre-arranged program determines the desired temperature at any specified time. The control of the sequential operation in this manner by such a cam is termed "cutting the program." When it is desired to maintain a fixed or manually operated temperature, the control is manually moved when and as required, to the desired position.

The output of rectifier 9 is filtered by condenser 21 and impressed upon the control grid 11a of the thyratron 11. The thyratron 11 includes cathode 11b adjacent the control grid 11a, auxiliary grid 11c and anode 11d. The auxiliary grid 11c connects through resistor 22 with one side of the impressed alternating current source $E_p$, connected at terminals 12 which may be 110 volts A. C. The output of the thyratron extending from anode 11d includes the load circuit to be controlled, such as the heater, represented at 14. A filter condenser 23 connects across the power supply $E_p$.

The thyratron grid bias for grid 11a is derived from the rectifier 9 by means of the connection of the control grid 11a to resistor 17 in series with tap 18, movable over potentiometer 19 shunt connected with battery 20. Thus the magnitude of the positive plate pulses depend upon the value of the current output from the rectifier. Magnitude of the heating current is dependent upon the size or number of the thyratrons 11 that are used in the circuit. By selecting a thyratron of larger size or connecting a multiple number of thyratrons in parallel, a larger heating current may be supplied. The control circuit may also be used for the control of a cooling unit wherein the output of the thyratron connects to a refrigeration control circuit.

I have found the system of my invention highly effective in the control of temperature from piezoelectric crystal circuits, providing greater precision and accuracy than is obtainable from customary thermostats and thermocouple units. I realize, however, that modifications in the system of my invention may be made and I intend no limitations upon my invention other than may be imposed by the scope of the appended claims.

What I claim as new and desire to secure by Letters Patent of the United States is as follows:

1. In a temperature control system a pair of piezoelectric crystals, one of said piezoelectric crystals being sensitive to changes in temperature for producing shifts in frequency and variable frequency oscillations corresponding thereto, the other of said piezoelectric crystals being temperature controlled for the production of constant frequency oscillations, means for combining the oscillations from each of said piezoelectric crystals, a resistive capacitive network interposed in a path common to the combined oscillations, a rectifier connected with said resistive capacitive network, an electron tube including input and output circuits, a connection between said input circuit, and the output of said rectifier, a load circuit and a power source connected with said output circuit, whereby, the power impressed upon said load circuit is controlled in accordance with the frequency difference between said piezoelectric crystals.

2. In a temperature control system a pair of piezoelectric crystals, one of said piezoelectric crystals being sensitive to changes in temperature for producing shifts in frequency and variable frequency oscillations corresponding thereto, the other of said piezoelectric crystals being temperature controlled for the production of constant frequency oscillations, means for combining the oscillations from each of said piezoelectric crystals, a resistive capacitive network interposed in a path common to the combined oscillations, a rectifier connected with said resistive capacitive network, an electron tube including input and output circuits, bias control means interposed between the output of said rectifier and the input circuit of said electron tube, a power source, a load, connections between said power source, said load and said output circuit, whereby, said electron tube is biased under control of said rectifier to regulate the application of said power source to said load according to the difference in frequency between said piezoelectric crystals.

RICHARD K. BLACKBURN.

REFERENCES CITED

The following references are of record in the file of this patent:

UNITED STATES PATENTS

| Number | Name | Date |
|---|---|---|
| 1,746,125 | Mirick | Feb. 4, 1930 |
| 1,907,132 | Thurston | May 2, 1933 |
| 2,017,859 | Halstead | Oct. 22, 1935 |
| 2,203,689 | MacDonald | June 11, 1940 |
| 2,230,649 | Mason | Feb. 4, 1941 |